May 24, 1932.   R. MAISEL   1,859,520
PISTON SEALING MEANS
Filed Dec. 15, 1926
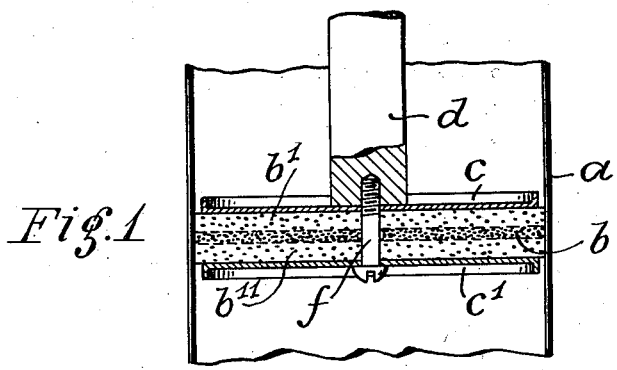
Fig.1
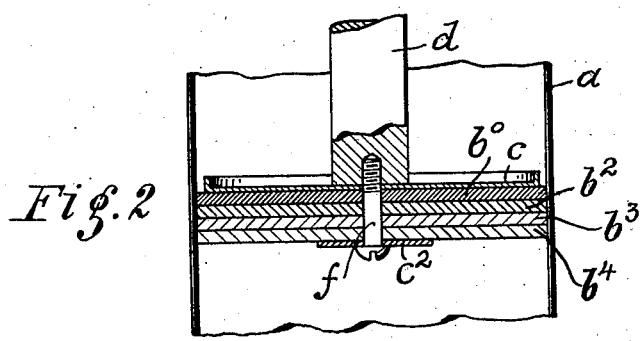
Fig.2
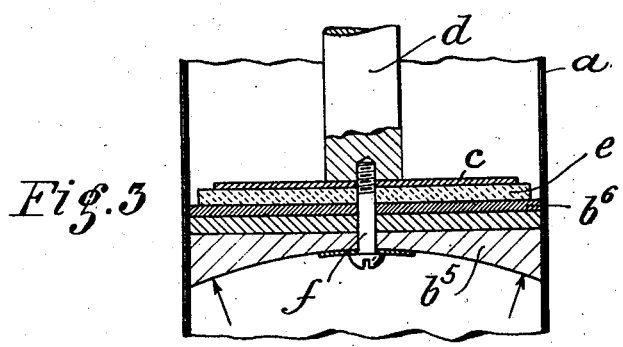
Fig.3
Inventor
Robert Maisel
per
Attorney Patented May 24, 1932

1,859,520

UNITED STATES PATENT OFFICE

ROBERT MAISEL, OF MUNICH, GERMANY, ASSIGNOR OF ONE-THIRD TO MASCHINEN-FABRIK HÖRSELGAU AKTIENGESELLSCHAFT, OF WALTERSHAUSEN, GERMANY, AND ONE-THIRD TO DR. WILHELM SCHWARZWÄLDER, OF MUNICH, GERMANY

PISTON SEALING MEANS

Application filed December 15, 1926, Serial No. 154,903, and in Germany December 31, 1925.

The present invention has reference to improvements in pistons for pumps, jacks, and other devices for various purposes, and it relates more specifically to a new packing means for such pistons, which means, according to this invention, consists of a built-up packing body presenting a plurality of integrally or individually contiguous layers or discs of different degrees of elasticity, which not only assures at all times a tight fit and seal with the surrounding cylinder wall, but also imparts to the piston, when placed under pressure, a certain self-movement, as it were, which on rising pressure effectively prevents frictional binding of the piston.

In order to make my invention readily understood, I will now describe it in detail in connection with the accompanying drawings, in which several embodiments of the invention are illustrated by way of example, all three figures showing similar vertical median sections through piston heads, with slight modifications in the building-up of the packing member, but all directed to the same invention idea.

In the several figures the same reference letters have been used to denote like parts. In the preferred embodiment illustrated in Fig. 1 the piston head with its stem $d$ reciprocates within the cylinder $a$. The piston head is composed of the rigid metal top and bottom plates $c$ and $c^1$ respectively, between which is clamped by means of the screw bolt $f$ a packing body comprising three distinct layers $b^1$, $b$, and $b^{11}$, the intermediate layer $b$ of which is of less elasticity than the two flanking outer layers $b^1$ and $b^{11}$. Such an arrangement is especially suitable for pistons alternately acted upon by a gaseous or liquid pressure medium on both faces. The material composing the packing body, for instance, may be rubber and the packing member may be made as an integral unit and so that the degree of elasticity gradually increases outwardly from a median zone of maximum density, that it to say minimum elasticity, or the packing body may be assembled from individual discs of different elastic character, and the layers then vulcanized or otherwise securely joined all over their contacting faces to form a unitary structure.

In Fig. 2 the packing body is shown as being built-up of four individual layers, the most compact and least elastic layer $b^0$ of which is on top, backed by the rigid piston head plate $c$, and the three other layers $b^2$, $b^3$ and $b^4$ of stepwise increasing elasticity are clamped thereto by the bottom washer $c^2$ and screw $f$. The number of such individual discs or layers, obviously, can be varied to suit obtaining requirements.

According to the modification shown in Fig. 3, the lowermost individual plate $b^5$ is upwardly dished on its pressure medium impinged underface, which conformation assures, even on relatively low pressure, a tight packing contact with the cylinder wall, since the pressure medium, acting against the vaulted underface in the direction of the arrows, will cause a bulging-out of the circumferential cylinder contacting zone.

In this constructional embodiment I have shown an additional plate $e$ between the top abutment plate $c$ and the uppermost, more or less elastic plate $b^6$, which plate $e$ is of inelastic material, for instance vulcanite fiber, or the like, and aside from its stiffening purposes, serves to keep the piston plate $c$ from contacting with the cylinder wall.

In the several shown and described arrangements the behavior and effect of the packing means are such that on putting pressure on the piston the gradually increasing resistance of the packing allows of the latter being compressed to a certain degree whereby the moment of inertia of the frictionally impeded piston is overcome, preventing its sticking. If the packing member were of uniformly elastic material throughout it would have the disadvantages of presenting too little resistance, especially under high pressures, and a tight seal could not be assured.

A packed piston of the described character can be used in various arts, for one-sided, or alternate, double-sided pressures.

What I claim is:—

1. A piston head having a unitary elastic body of a constituency maintaining its elasticity during its useful life, said body presenting a plurality of homogeneous, soft elastic zones of different degrees of elasticity from zone to zone between opposed faces of the body.

2. A piston head having an elastic body of a consistency designed to maintain its elasticity throughout its useful life period, said body presenting a plurality of soft elastic zones each of a composition to permanently maintain its elastic character, said zones being of varying degrees of elasticity from zone to zone between the opposite faces of the body.

ROBERT MAISEL.